United States Patent [19]
Horigome

[11] Patent Number: 6,016,294
[45] Date of Patent: Jan. 18, 2000

[54] AGC CIRCUIT WITH A DIGITAL DIVIDER FOR AN OPTICAL DISC DRIVE UNIT

[75] Inventor: Junichi Horigome, Kanagawa, Japan

[73] Assignee: Sony Corporation, Tokyo, Japan

[21] Appl. No.: 08/048,117

[22] Filed: Apr. 14, 1993

[30] Foreign Application Priority Data

Apr. 16, 1992 [JP] Japan ................................ 4-122635

[51] Int. Cl.[7] .................................................. G11B 7/095
[52] U.S. Cl. ..................... 369/44.36; 369/54; 369/44.34
[58] Field of Search ............................. 369/44.25, 44.29, 369/44.34–44.36, 44.41, 54

[56] References Cited

U.S. PATENT DOCUMENTS

| 5,004,901 | 4/1991 | Yoshimoto et al. | 369/44.29 X |
| 5,124,967 | 6/1992 | Isaka et al. | 369/44.36 X |
| 5,210,732 | 5/1993 | Suenaga et al. | 369/44.35 X |

FOREIGN PATENT DOCUMENTS

| 0 392 561 A2 | 10/1990 | European Pat. Off. . |
| 0 395 403 A2 | 10/1990 | European Pat. Off. . |
| 3-269829 | 12/1991 | Japan . |

OTHER PUBLICATIONS

Patent Abstracts of Japan, vol. 16, No. 89 (P–1320), Mar. 4, 1992 & JP-A–03 269 829 (Hitachi), Dec. 2, 1991.
Patent Abstracts of Japan, vol. 12, No. 430 (E–682), Nov. 14, 1988 & JP-A–63 166 318 (Rohm Co), Jul. 9, 1988.
Patent Abstracts of Japan, vol. 8, No. 238 (P–310) (1694), Oct. 30, 1984 & JP-A–59 113 531 (Sony K K), Jun. 30, 1984.
Patent Abstracts of Japan, vol. 12, No. 380 (P–769), Oct. 12, 1988 & JP-A–63 124 228 (Matsushita Electric Ind Co.), May 27, 1988.
Patent Abstracts of Japan, vol. 12, No. 406 (P–777), Oct. 27, 1988 & JP-A–63 144 428 (Matsushita Electric Ind Co.), Jun. 16, 1988.
Patent Abstracts of Japan, vol. 14, No. 408 (E–0972), Sep. 4, 1990 & JP-A–02 152 326 (Matsushita Electric Ind Co.), Jun. 12, 1990.

*Primary Examiner*—W. R. Young
*Attorney, Agent, or Firm*—Limbach & Limbach L.L.P.

[57] ABSTRACT

By an output signal from a four-section detector, arithmetic is done to generate a tracking error signal TE, a focus error signal FE, and on a total light amount signal Y. The signals are submitted to time division multiplexing, and are entered as a reference voltage of a D/A converter. As a digital input of the D/A converter, data DB from a reciprocal table is supplied. The DB is a reciprocal of the data DA which is a digitalized total light amount signal Y. In the D/A converter, the error signal and data DB are multiplied together so as to generate an error signals of which amplitude is constant against variation in laser power. By the error signal, a servo drive signal is generated in a signal processing circuit.

9 Claims, 2 Drawing Sheets

AGC CIRCUIT WITH A DIGITAL DIVIDER FOR AN OPTICAL DISC DRIVE UNIT

BACKGROUND OF THE INVENTION

1. Field of the Invention

This invention relates to an AGC circuit of an optical disc drive unit which is applied to a servo signal of an optical disc such as a magneto optical disc.

2. Description of the Prior Art

A tracking servo to guide an optical pickup spot along a track and a focus servo to correctly converge the spot on a recording side on a disc are performed in conventional optical disc drive units. To actuate the servomechanism, a tracking error signal in correspondence with a tracking error, and a focus error signal in correspondence with a focus error are generated.

For example, a focus error signal and tracking error signal can be generated by receiving light reflected by a disc on a four-element detector, and then by doing arithmetic by astigmatism method and push-pull method according to the received light. In correspondence with the error signals, a servo drive signal is generated to change the direction of an objective lens of an optical pickup in the tracking and focus directions.

The amplitude of an error signal indicates the amount of the error. There is a problem that the amplitude of the error signal varies with operation mode and with dispersion in quality of discs. For example, in magneto optical discs, laser power to record or to erase is considerably large, compared with laser power for reproduction. As a result, the level of a detector output signal varies with the operation mode. In writing also, the average laser power varies with contents of the data. Furthermore, optical discs have different reflectivity, and the amplitude of an output signal varies, because of dispersion in amount of discs. These kinds of changes in amplitude of the error signals results in a problem of reduced precision of the tracking servo or the focus servo.

As shown in FIG. 1, an AGC (automatic gain control) circuit is provided with the analog dividers 31 and 32. The AGC circuit is supplied with a focus error signal FE and tracking error signal TE as dividend output, and the signal Y for the total amount of light as divisor input. Output signals from the analog dividers 31 and 32 are supplied to the signal processing circuits 33 and 34, respectively. Then, tracking servo drive signals and focus servo signals are generated respectively. The servo drive signals are supplied to the electromagnetic actuators 37 and 38 through the drive amplifiers 35 and 36. The objective lens of the optical pickup can be displaced along a direction by the actuator 37 in the focus direction, and by the actuator 38 along the tracking direction.

In conventional AGC circuits, amplitude is normalized by the analog dividers 31 and 32, which are complicated in configuration. Furthermore, there are potential problems of easy occurrence of offset due to variation in temperature and power supply.

OBJECTS AND SUMMARY OF THE INVENTION

It is therefore an object of the invention to provide an AGC circuit for an optical disc drive unit, which can be composed of digital circuits and can be controlled by software.

According to an aspect of the present invention, there is provided an AGC circuit for an optical disc drive comprising means for generating tracking and focusing error signals using an output signal, which is supplied from an optical pickup detector, and an actuator for correcting an error, which is driven by a servo drive signal generated by the error signal. The AGC circuit includes a detecting means for determining an amount of light reflected from the optical disc. The AGC circuit further includes a table means for generating data which is a reciprocal of a signal from the detecting means. The AGC circuit further includes a D/A converter to which the error signal is supplied as a reference signal, and the reciprocal data is supplied as a digital input.

The above, and other, objects, features and advantages of the present invention will become readily apparent from the following detailed description thereof which is to be read in connection with the accompanying drawings.

DETAILED DESCRIPTION OF THE PREFERRED EMBODIMENTS

Figure 2:
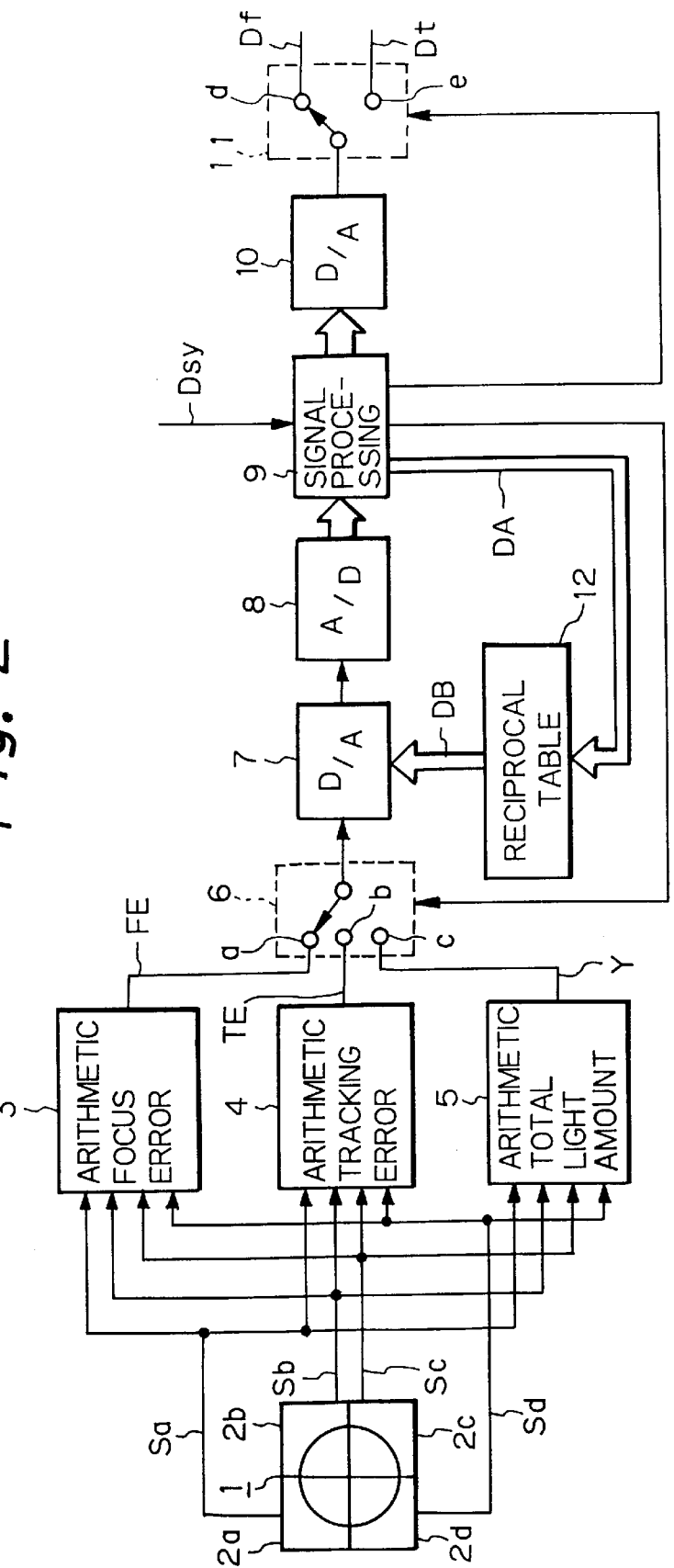
FIG. 2 is a block diagram of an embodiment of the invention.

An embodiment of the invention is described below with reference to the drawings. In FIG. 2, the reference numeral 1 denotes a four-element detector included in an optical pickup. On the photo detecting surface of the detector 1, laser beams reflected by a disc are converged so as to form a light spot. The detector 1 includes the photo detecting elements 2a, 2b, 2c and 2d. The detection signals from the photo detecting elements are denoted as Sa, Sb, Sc and Sd, respectively.

The detection signals Sa to Sd are supplied to the focus error arithmetic circuit 3, tracking error arithmetic circuit 4, and to the total light amount arithmetic circuit 5. In the focus error arithmetic circuit 3, a focus error signal FE is generated according to the astigmatism method as indicated in the following equation:

$$FE=(Sa+Sc)-(Sb+Sd)$$

In the tracking error arithmetic circuit 4, a tracking error signal TE is generated according to the following equation:

$$TE=(Sa+Sb)-(Sc+Sd)$$

Furthermore, the total light amount arithmetic circuit 5 generates a total light amount signal Y (=Sa+Sb+Sc+Sd).

From the arithmetic circuits 3, 4 and 5, the above-mentioned error signals FE, TE, and total light amount signal Y are supplied to input terminals a, b and c of an input selection circuit 6, respectively. The input selection circuit 6 submits the signals to time division multiplexing. Time division multiplexing contributes to reduction of a circuit size. While the preferred embodiment of FIG. 2 illustrates this time division multiplexing feature, this invention is applicable equally to parallel processing. A time division signal from the input selection circuit 6 is supplied to a D/A converter 7 as its reference voltage. An output signal from the D/A converter 7 is converted into a digital signal by an A/D converter 8. An output signal from the A/D converter 8 is supplied to a signal processing circuit 9.

The signal processing circuit 9 forms a servo drive signal in correspondence with a system control data Dsy entered from a system controller (not shown). This formation is made by hardware or software. The servo drive signal from the signal processing circuit 9 is supplied to a D/A converter 10 and an analog servo drive signal is obtained. A time division multiplexed servo signal from the D/A converter 10 is supplied to the output selection circuit 11.

The output selection circuit 11 has output terminals d and e, and takes out a focus servo drive signal Df to the terminal d, and a tracking servo drive signal Dt to the terminal e. The signal processing circuit 9 generates a signal to control the input selection circuit 6 and output selection circuit 11. Through the drive amplifier, the drive signals Df and Dt are supplied to an actuator for focusing and an actuator for tracking, respectively.

In the signal processing circuit 9, data DA of the total light amount signal Y is separated and is supplied to a reciprocal table 12 consisting of ROM. An output signal DB from the reciprocal table 12 is (DB=α/DA), where α a is a predetermined value. Data DB read out from the reciprocal table 12 is supplied as digital input of the D/A converter 7. Output from the D/A converter 7 is a value obtained by multiplying an error signal FE or TE by DB(=α/DA). The amplitude of an error signal FE or TE varies in proportion to laser power. As the data DA equally varies in proportion to laser power, output data from the D/A converter 7 becomes a constant signal independent of laser power.

Figure 1:
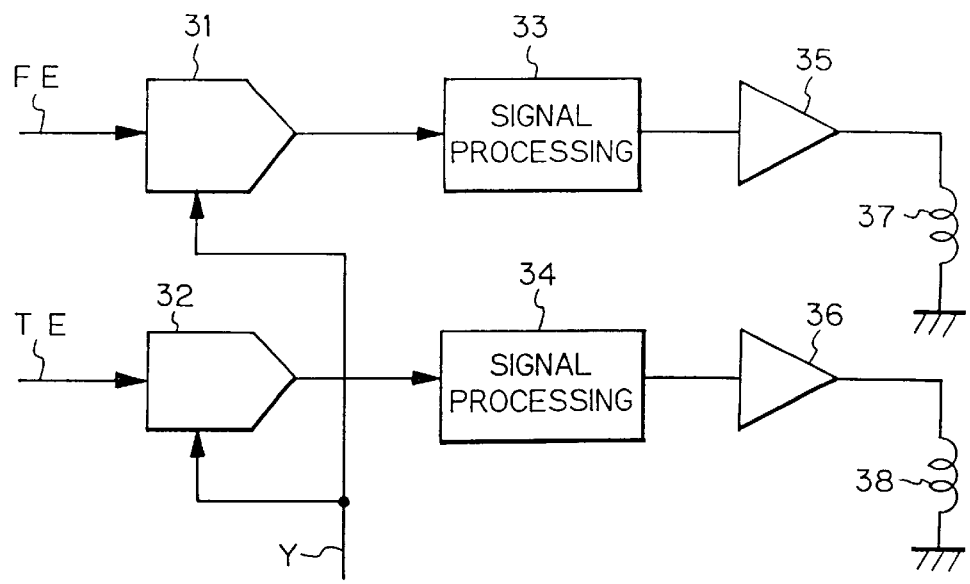
FIG. 1 is a block diagram of a conventional AGC circuit.
Figure 3:
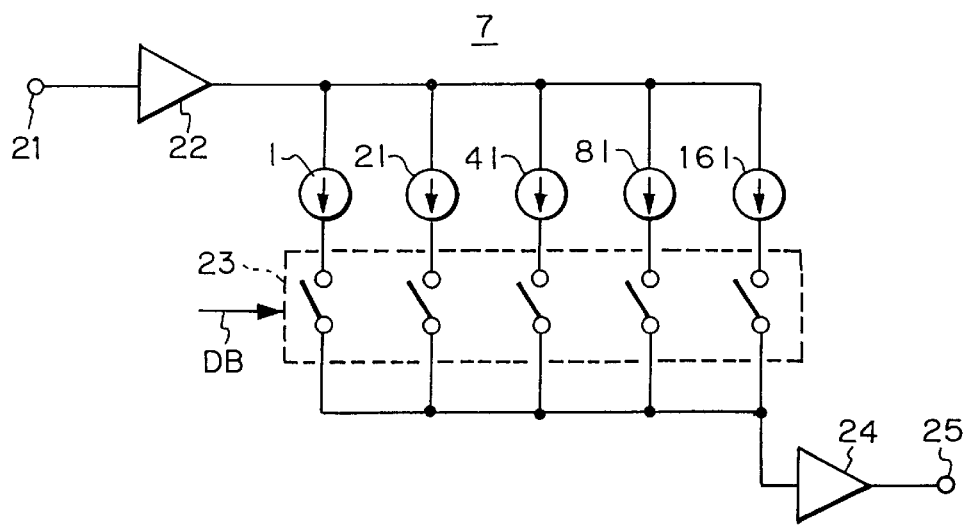
FIG. 3 is a block diagram of an example of the D/A converter which can be used in connection with the invention.

FIG. 3 denotes an example of the D/A converter 7. A time division multiplexed detection signal from the input selection circuit 6 is supplied to the input terminal denoted at 21, and is converted from voltage to current by the amplifier 22. The input terminal 21 is a reference voltage input terminal. Typically, a predetermined DC voltage is used as reference voltage. To the output side of the amplifier 22, the current sources I, 2I, 4I, 8I and 16I are connected in parallel. A switch circuit 23 including switches serially connected with each current source is provided.

Each switch of the switch circuit 23 is controlled by each bit, for example, of 5-bit data DB from the reciprocal (=α/DA). That is, the switch connected with the current source 16I is switched on or off by MSB of the data DB, and permits on/off control of the switches connected with 8I, 4I, 2I and I, respectively by four lowest-order bits. When a bit is "1", the switch turns on, while a bit is "0", the switch turns off. The output currents from the switch circuit 23 are added to each other, and are supplied to the amplifier 24. Then, the amplifier 24 converts them from current to voltage. The output voltage from the amplifier 24, which is taken out to the output terminal 25, is supplied to the A/D converter 8.

The D/A converter 7 mentioned above generates an output voltage which is obtained by multiplying data DB by a tracking error signal TE or focus error signal FE. As the data DB is a reciprocal of the signal DA proportional to laser power, the output signal from the D/A converter 7 is converted into a signal having a constant amplitude against variation in laser power. The D/A converter shown in FIG. 3 is an example. Other configurations of the D/A converter can be used. For example, it may be possible to combine in parallel the current source I and the switches in the number of $2^{n-1}$, where n is the number of DB bits, so as to supply data DB to a decoder, and to control the switches by output of the decoder.

The total light quantity can be detected by a separate detector from the detector to detect an error signal. Furthermore, this invention is applicable not only to a magneto optical disc but also to the other types of optical discs such as WO discs.

Unlike other types using an analog divider circuit, this invention has a low incidence of offset and permits a high-precision control, with an adequate configuration for allowing composition by ICs. In addition, this invention has another advantage of lower software overheads. It is to be understood that the present invention is not limited to the above described embodiments, and that various changes and modifications could be effected by one skilled in the art without departing from the spirit or scope of the invention as defined in the appended claims.

What is claimed is:

1. An AGC circuit for an optical disc drive including means for generating a tracking and focusing error signal by utilizing an output signal supplied from an optical pickup detector, and an actuator for correcting an error, which is driven by a servo drive signal generated by a normalized error signal, the AGC circuit comprising:

detecting means for determining an amount of light reflected from an optical disc and outputting a total light amount signal corresponding to the amount of reflected light;

table means for generating reciprocal data which is a reciprocal of the total light amount signal output from said detecting means; and a D/A converter to which said tracking and focusing error signal is supplied as its reference signal, and said reciprocal data is supplied as its digital input, with the D/A converter outputting the normalized error signal.

2. An AGC circuit for an optical disc drive according to claim 1, wherein said D/A converter includes a plurality of current sources in parallel for generating reference currents corresponding to the tracking and focusing error signal, and a plurality of switching elements connected respectively to said current sources and controlled by the reciprocal data.

3. An AGC circuit for an optical disc drive according to claim 1, wherein said detecting means is a four-element detector having first, second, third and fourth photo detectors which receive an optical spot reflected from the optical disc.

4. An AGC circuit for an optical disc drive according to claim 3, said detecting means further comprising a first arithmetic means for generating a focus error signal FE by a formula (Sa+Sc)−(Sb+Sd), a second arithmetic means for generating a tracking error signal TE by a formula (Sa+Sb)−(Sc+Sd), and a third arithmetic means for generating the total light amount signal Y by a formula (Sa+Sb+Sc+Sd), where Sa, Sb, Sc, and Sd are output signals from the first, second, third and fourth photo detectors respectively.

5. An AGC circuit according to claim 1, wherein the D/A converter generates the normalized error signal corresponding to the product of the tracking and focusing error signal and the reciprocal data.

6. An AGC circuit according to claim 1, wherein the tracking and focusing error signal is a signal corresponding to a tracking error of the optical disc.

7. An AGC circuit according to claim 1, wherein the tracking and focusing error signal corresponds to a focusing error of the optical disc.

8. An AGC circuit according to claim 1, wherein the tracking and focusing error signal is a time multiplexed signal, with portions of the tracking and focusing error signal corresponding to a tracking error of the optical disc and portions of the tracking and focusing error signal corresponding to a focusing error of the optical disc.

9. An AGC circuit according to claim 8, wherein the detecting means comprises:

a four-element photo detector which outputs first, second, third and fourth light amount signals respectively corresponding to light detected by each element of the four-element photo detector;

a first arithmetic element for calculating a focusing error signal based on the first, second, third and fourth light amount signals output from the photo detector;

a second arithmetic element for calculating a tracking error signal based on the first, second, third and fourth light amount signals output from the photo detector;

a third arithmetic element for calculating a total light amount signal based on the first, second, third and fourth light amount signals output from the photo detector;

a multiplexing element for outputting the tracking and focusing error signal as a time multiplexed signal based on the focusing error signal, the tracking error signal and the total light amount signal.

* * * * *